United States Patent [19]
Pecht et al.

[11] Patent Number: 5,605,339
[45] Date of Patent: *Feb. 25, 1997

[54] NON-CONTACTING MECHANICAL FACE SEAL

[75] Inventors: Glenn G. Pecht, Vernon Hills; Jon B. Hamaker, Schaumburg, both of Ill.

[73] Assignee: John Crane Inc., Morton Grove, Ill.

[ * ] Notice: The term of this patent shall not extend beyond the expiration date of Pat. No. 5,441,283.

[21] Appl. No.: 514,865

[22] Filed: Aug. 14, 1995

Related U.S. Application Data

[63] Continuation of Ser. No. 101,589, Aug. 3, 1993, Pat. No. 5,441,283.
[51] Int. Cl.$^6$ ............................................. F16J 15/34
[52] U.S. Cl. .............................. 277/96.1; 277/81 R
[58] Field of Search ..................... 277/96, 96.1, 96.2, 277/81 R

[56] References Cited

U.S. PATENT DOCUMENTS

| | | | |
|---|---|---|---|
| 5,201,531 | 4/1993 | Lai | 277/96.1 |
| 5,222,743 | 6/1993 | Goldswain et al. | 277/96.1 |
| 5,441,283 | 8/1995 | Pecht et al. | 277/96.1 |

FOREIGN PATENT DOCUMENTS

| | | | |
|---|---|---|---|
| 1719756 | 3/1992 | U.S.S.R. | 277/96.1 |

*Primary Examiner*—Daniel G. DePumpo
*Attorney, Agent, or Firm*—Dorn, McEachran, Jambor & Keating

[57] ABSTRACT

Improved spiral grooves in a mechanical face seal have plural terminal corners which more evenly distribute the fluid pressure generated within the seal gap into discrete pressure zones which are radially displaced and may also be circumferentially displaced from the other pressure zones generated by the same groove. Alternative embodiments include grooves having surfaces of varying depths wherein each of the plural terminal groove corners is associated with a section of the groove having a surface at a particular depth.

11 Claims, 5 Drawing Sheets

NON-CONTACTING MECHANICAL FACE SEAL

CROSS REFERENCES TO RELATED APPLICATIONS

This is a continuation of application Ser. No. 08/101,589, filed on Aug. 3, 1993, now U.S. Pat. No. 5,441,283.

BACKGROUND OF THE INVENTION

1. Field of the Invention

This invention relates generally to rotary mechanical end face seals and more particularly to rotary mechanical end face seals having spiral grooves for creating a fluid gap between the sealing faces.

2. Background Art

Mechanical face seals long have been used for sealing between a housing and a relatively rotating shaft. More recently, grooves have been introduced into the sealing face of at least one of the sealing rings to help generate a gap between the seal faces, which gap separates the rings. These type of seals are generally referred to as non-contacting seals. Spiral grooves have been utilized for pumping fluid between the seal faces so that the fluid creates a small gap between the faces during shaft rotation. Examples of spiral grooved faces are found in U.S. Pat. No. 3,499,653 and in U.S. Pat. No. 4,212,475, both of which are commonly assigned with the present invention and the teachings thereof which are incorporated herein by reference.

The spiral grooves heretofore disclosed comprise two generally smooth boundary curves which separate the grooved area from the land. These two boundary curves are essentially parallel to each other and each terminate at end points disposed essentially at the same radial distance from the centerline of the seal face. These two end points are joined by a transverse boundary which, for the most part, extends in the circumferential direction to produce the spiral groove patterns shown in FIG. 2 of each of U.S. Pat. Nos. 3,499,653 and 4,212,475.

It has been found that spiral grooves of the prior art seals are effective for providing a gap between the seal faces. Nevertheless, these types of seal face patterns have characteristics that result from the shape of the grooves. The shape of the grooves includes a single terminal corner at the point where the trailing boundary of the groove intersects a circumferential boundary of the groove to provide an acute angle at the intersection point. The angle is located between the two circumferential edges of the sealing face and is referred to herein as a terminal corner.

The single terminal corner design results in a pressure "zone" that is created adjacent the terminal corner of each groove. For the set of grooves in a standard spiral groove seal face, one such zone is produced by each groove. It is thought that this pressure zone occurs at a spot on the land immediately adjacent the groove terminal corner, and more specifically, at the edge of the land opposite the direction in which the seal face is relatively rotating and on the other side of the boundary line between the groove and land from the groove. The pressure buildup at this point is thought to occur because of the converging fluid mass flow into the terminal corner which occurs from the converging trailing and circumferential boundaries of the groove at the intersection point. In the conventional spiral groove sealing face, the pressure zones associated with each groove are thus each disposed at approximately the same radial position relative to the shaft centerline but are circumferentially displaced at or immediately adjacent the boundary line between the grooved portion and the ungrooved portion or dam.

The creation of a limited number of pressure zones, necessarily limited by the one-to-one relationship with each of the standard spiral grooves, is sufficient to provide enough lift to separate the faces of a mechanical face seal and to create the gap therebetween. In the spiral grooves of U.S. Pat. No. 3,499,653 and of U.S. Pat. No. 4,212,475, the number of pressure zones are limited to the total number of spiral grooves which are present in the seal face, and these are arranged at essentially identical radii along a circumferential line approximately adjacent the boundary between the grooved portion and the dam.

SUMMARY OF THE INVENTION

This invention discloses a mechanical face seal for providing a seal between a pair of relatively rotatable components comprising a first seal ring adapted to be mounted non-rotatably on one component and sealed with respect thereto, a second seal ring adapted to be mounted non-rotatably on the other component and sealed with respect to the other component, the second seal ring being mounted in axial alignment with the first seal ring, and means being provided for resiliently urging a sealing face of the first seal ring axially into sealing engagement with a sealing face of the second seal ring, the sealing face of one of the seal rings having an annular grooved area disposed around its circumference, the grooved area opening to one edge of the sealing face, a continuous annular dam formation being provided between the grooved area and the other edge of the sealing face, the grooved area having: a plurality of grooves angularly disposed and extending radially and circumferentially in a given direction partially across the sealing face from one circumferential edge of the sealing face toward the other circumferential edge, each groove having at least two boundaries, each boundary extending generally radially and circumferentially, and one of the boundaries having plural terminal corners as further defined herein.

DETAILED DESCRIPTION OF THE PREFERRED EMBODIMENTS

Figure 1:
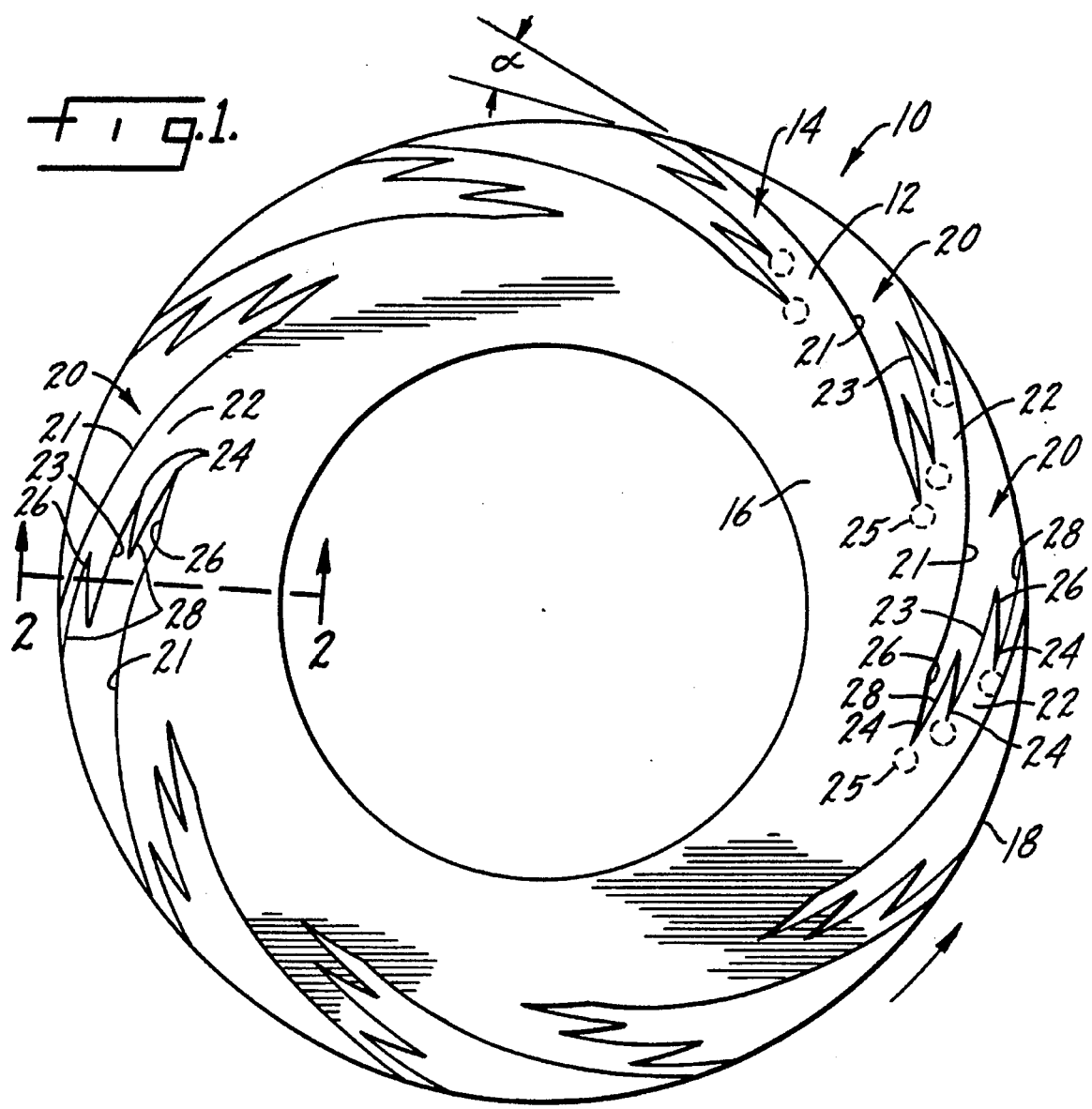
FIG. 1 is a seal face having a spiral groove face pattern according to the present invention.

FIG. 1 illustrates a seal ring 10 having a generally radially extending seal face 12 which is shaped and dimensioned to oppose the face on opposing seal face of a second ring (not shown). The seal ring 10 may be either a primary or a mating ring, and may either rotate with the shaft (not shown) or be sealingly connected to the housing (not shown) as is explained in the aforementioned U.S. Pat. No. 3,499,653 and U.S. Pat. No. 4,212,475. The seal face 12 has a discrete pattern of grooved surfaces and ungrooved surfaces as do the seal faces of the aforementioned patents. An annular grooved portion 14 is adjacent one of the circumferential edges of the seal ring 10 and another annular dam 16 is at the other of the circumferential edges. In the embodiment of FIG. 1, the annular grooved surface 14 is adjacent the outer diameter circumferential edge 18 of the seal ring 10. However, as in the seal rings of the aforementioned patents, the annular grooved surface may extend from either the outer diameter edge 18, as is shown, or from the inner diameter edge of the seal ring, depending on the design of the mechanical end face seal.

The annular grooved surface 14 further comprises a plurality of grooves 20 which are evenly spaced around the periphery of the annular grooved portion 14. Lands 22 separate adjacent ones of the grooves 20. The grooves 20 are similar in many respects with the grooves of the aforementioned patents in having as a boundary one of the circumferential edges, such as edge 18, of the seal ring face 12. At least two other boundaries define each groove 20, a first groove boundary 21 which extends both circumferentially and radially and a second jagged groove boundary 23, which also extends circumferentially and radially. However, in the inventive seal, one of the circumferentially and radially extending boundaries 21,23 of grooves 20 includes plural terminal corners 24. These corners 24 provide a number of advantages as will be discussed below.

The plural terminal corners 24 are each formed in one of the two boundaries 21,23. The boundary, for example 23, preferably comprises a sequential series of circumferentially extending edges, such as edges 26, joined to each other by a series of second edges 28, which extend both circumferentially and radially. Each of the terminal corners 24 are formed by an adjacent pair of converging edges 26,28. The boundary (23) with the terminal corners 24 also generally extends in the radial direction, and may extend circumferentially in the same general direction as the other boundary (21).

The boundary which provides the leading edge of the groove 20 when the seal ring 10 rotates in the intended direction, as shown by the arrow, is referred to as the leading edge boundary and is indicated by 21 in FIG. 1. The leading edge boundary 21 is the first part of a groove 20 which passes a theoretical stationary point located directly over the sealing face 12. The leading edge boundary defines an acute angle e with the circumferential edge 18, as shown in FIG. 1. In the preferred embodiment, the angle $\alpha$ is approximately 19° but may take on other values in a range of from 5° to about 85° depending on the design of the seal and on other seal parameters, such as shaft rotational speed. The leading edge boundary 21 is also generally convergent with the trailing edge 28 that intersects the circumferential edge 18 when both edges 21,28 are extrapolated.

The structure of each groove 20 may be considered to comprise several adjacent grooves, of the type described in U.S. Pat. No. 4,212,475, which have differing lengths and have been joined together without intervening lands between them. One of the boundaries 21 or 23 follows the same path as would a leading edge boundary of a conventional spiral groove. The other boundary, indicated by 23 in FIG. 1, includes distinct corners 24 having ending points which are disposed along the boundary 23 and which are formed by adjacent converging edges 26,28. These ending points, referred to herein as terminal corners 24, are preferably displaced both in the radial and in the circumferential directions from other adjacent terminal corners of the same groove, as shown. Nevertheless, grooves with terminal corners which may be aligned along a common radius can also operate effectively.

The number of grooves 20 around the periphery of the annular groove surface 14 may be in a range of from two to sixty depending on the size of the seal face and of the outer diameter of the seal ring 10. The grooves 20 should be evenly spaced about the annular grooved area 14 in a radially symmetric pattern.

A land to groove ratio from one to three to one to five is preferred. The land to groove ratio, as defined herein, is the ratio of the circumferential width of the land 22 as compared to the groove 20. The circumferential width is the linear dimension of the circumscribing arc taken at the circumferential edge 18. The land to groove ratio is calculated by taking the arc bounding the land 22 in relation to that bounding the groove 20, both taken at the circumferential edge 18. The specific ratio will depend on the design of the mechanical seal with which these seal ring faces are used and may vary significantly from a one to three through one to five ratio depending on seal design.

Preferably, the number of terminal corners 24 which are associated with the jagged boundary 23 of each groove 20 may range from two to ten depending on the width of the face and on the size of the ring. The groove depths may have a preferred range of from 25 to 2000 microinches, as is desired for specific uses of the seal ring.

During seal operation, as the shaft and seal face rotate, the fluid is pumped into the gap between the seal faces and the fluid must flow over the intersection point of each corner 24 formed by the associated edges 26,28. The fluid flow-inhibiting obstacle presented at the terminal corner 24 by the increase in surface height at the boundary 23 between the groove 20 and land 22 must be overcome. The volume in which the fluid is forced into by the converging edges 26,28 becomes constricted as the fluid reaches the terminal corner intersection point 24. The volume constriction and concentration of fluid into a smaller area raises the pressure of that fluid at or adjacent the point 24 and, as it flows over that intersection point, a pressure "zone" 25, shown in phantom, is created in the gap between the seal faces immediately adjacent the terminal corner 24.

To further aid in the constriction of volume available to the fluid, the leading edge boundary 21 is also preferably convergent with the boundary 23 and edges 28, which edges 28 also extend both radially and circumferentially. The boundary 21 is not shown to intersect with edges 28 in FIG. 1; it is contemplated that extrapolated extensions of the edges (not shown) could intersect at a point somewhere on the face 12 of the seal ring 10.

Since one of these pressure "zones" 25 are each associated with one of the groove terminal corners 24, the pressure zones are disposed across the seal face grooved area portion 14 following the pattern of the terminal groove corners in both the radial and circumferential directions in the general shape of a spiral. A seal face pattern having multiple pressure "zones", which are both circumferentially and radially disposed relative to each other, are considered to provide a more efficient bearing surface and a stiffer fluid film in the gap than those of a conventional spiral groove pattern. Moreover, the multiplicity of pressure "zones" bearing the seal faces minimizes the variation in the gap, and minimizes thermal differentials which would normally be caused by a single large pressure "zone", such as is produced by the spiral seal face patterns-of the aforementioned U.S. patents. The greater number of terminal corners 24 associated with each groove 20, as compared to conventional grooves, provides the advantage of more stable "lift" between the seal faces when the shaft rotates and the grooves pump fluid between the sealing faces. The added lift derives from the multiple pressure zones which are associated with each groove 20 at or adjacent the adjacent terminal corners 24. The staggering of the terminal corners 24, and the associated pressure zones, distributes a broader base of pressure over the seal face grooved portion 14. Although broader distribution of pressure zones reduces somewhat the amount of pressure generated by each terminal corner 24, staggering of the pressure zones over several terminal corners 24 increases the stiffness of the fluid film between the seal faces as that teem is conventionally defined in, for example, U.S. Pat. No. 4.,212,475.

Furthermore, despite the relative reduction in the amount of pressure at each pressure zone 25, the opening force of the grooves 20 is the same as, if not greater than, the opening force which results from the grooves of a conventional spiral groove pattern. If considered as an array of two-dimensional springs, the conventional spiral groove will have pressure zones or "springs" providing opening force to create the seal gap in a single circular pattern, each disposed at a common radius. These "springs" can be given an arbitrary force value of 3 which depends partly on the amount of fluid mass flow across the terminal corner of each groove.

For a seal face 12 according to the embodiment of FIG. 1, the same amount of mass flow of fluid being pumped by each groove produces three separate pressure zones 25, or "springs" for each groove 20, and each pressure zone provides an opening force having a comparable value of 1. The total opening force provided by the seal face is the same or possibly greater, since at lower pressures there is less tendency to deviate from a direct correlation between pressure at each zone and the opening force generated by that zone. Furthermore, the distribution of the opening force about a greater area of the seal face 12 has added stabilization advantages, as will be described below.

The decreased amount of distributed pressure at any single groove corner pressure zone 25 also tends to permit formation of a somewhat smaller gap between the seal faces, thus resulting in less leakage. The gap between the seal faces may be controlled for a specific seal design by altering some of the other parameters of the seal ring face, such as land to groove ratio, groove depths and/or angle of incidence of the leading or trailing edges. A smaller gap having a higher fluid stiffness is more stable due to the reactive opening force tending to re-open the gap if one of the rings is skewed slightly causing the gap width to close momentarily. That is, because some of the terminal corners 24 are disposed much closer to the outer diameter of the seal face, a greater moment arm is experienced. Thus, an upset in the parallel relation between the seal ring faces is counteracted by the angular dimension of the opening force, which because of the "leverage" provided by the larger moment arm, tends to act sooner on the seal ring than would a conventional groove seal ring.

The more immediately counteracting force also may be attributable to the smaller initial gap and increased fluid stiffness, which act more quickly to "right" the seal ring following an upset condition from parallel. Also, the pressure buildup at each of the pressure zones that are distributed radially across the seal face are all "compressed" together so that the plurality of pressure zones act as a "planar array spring" which has much less elasticity than would a conventional seal ring face, in which a "circular array" of springs are counteracting the closing force.

Still another advantage of the inventive seal face grooves 20 also is a result of the decreased pressure at each individual terminal corner 24 resulting from the distribution of the pressure generated by each individual groove 20. Continual pressure of the flowing fluid at a pressure zone 25 develops an increase in temperature at an area on the ring face immediately adjacent each terminal corner 24, and at about the same location as that indicated by the pressure zones 25. The increases in seal ring face temperature at these local areas create disproportionate variations in temperature as measured at different local areas of the seal face.

A corresponding higher temperature annular "band" also forms on the opposing seal ring face which results from the pressure zones continually passing over the same annular area on the opposing sealing face. The temperatures reached on the opposing seal face are not nearly as high as those generated on the grooved seal ring face because the pressure zones 25 are moving relative to a localized area on the opposing sealing face.

Decreased pressure of any one pressure zone 25 necessarily reduces the temperature which is developed by the pressure zone at any one local area. Thus, the temperature gradient taken over the full seal face width is reduced, and the increase in the temperature is distributed over a number of local areas separated from each other, each at a lower relative temperature. This further develops a greater uniformity of temperature across the seal face 14, because the temperature is more constant when measured across a greater radial swath of the seal ring face 12. Both reduced temperature gradient and the greater temperature uniformity minimize thermal taper or "warping" of the seal rings, which provides for even greater stability in the gap between the seal faces during shaft rotation.

Figure 3:
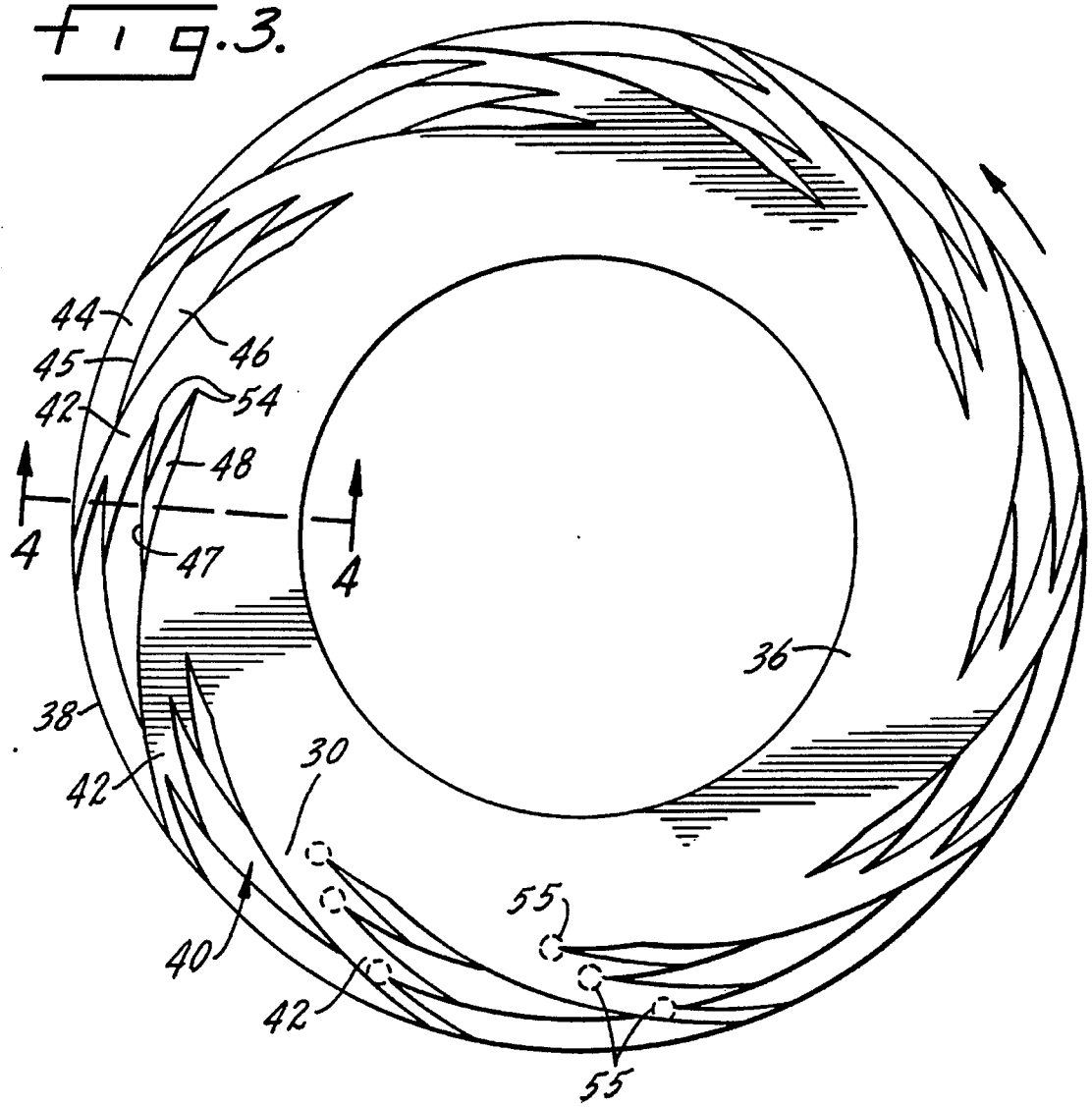
FIG. 3 is another embodiment of the seal face pattern according to the present invention.
Figure 4:
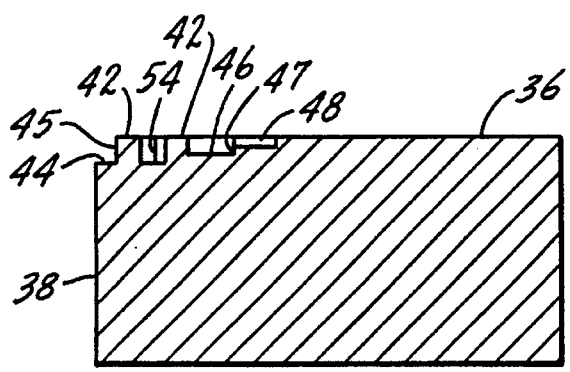
FIG. 4 is a cross-sectional view of a portion of the seal face of FIG. 3 taken approximately along line 4—4.

FIGS. 3 and 4 show that variable groove depths may be used to provide a customized, evenly distributed pressure zone profile for specific seals. For example, in FIG. 3, the grooves 40 are separated by lands 42. The lands 42 are at the same height as the dam 36. However, each of the grooves 40 may comprise, for example, three separate surfaces 44,46,48 having varying depths within each groove 40. FIG. 4 more clearly illustrates the three different surfaces at different depths. The radially outermost section has a surface 44 which is indicated in FIGS. 3 and 4 as the groove section closest to the circumferential edge 38 of the seal face 30. Surface 44 is at the greatest depth relative to the other two surfaces 46 and 48. An intermediate section has a surface 46 at an intermediate depth and the innermost section has a surface 48 which is at the shallowest depth.

As shown in FIG. 3, the surfaces of sections 44, 46 are separated by a circumferentially extending line 45; between section surfaces 46 and 48, there is a circumferentially extending boundary 47. Thus, a stepped groove pattern is created by separate circumferentially extending groove surfaces having different depths depending on the radial locations within the same groove 40.

The fluid experiences increasing height of the surfaces 44,46,48 as it is pumped further toward the terminal corners 54. The increasing height in passing from a section having deeper surface to a section having a shallower surface further constricts the volume in which the fluid is pumped, and necessarily changes the characteristics of the pressure "zone" 55.

Figure 5:
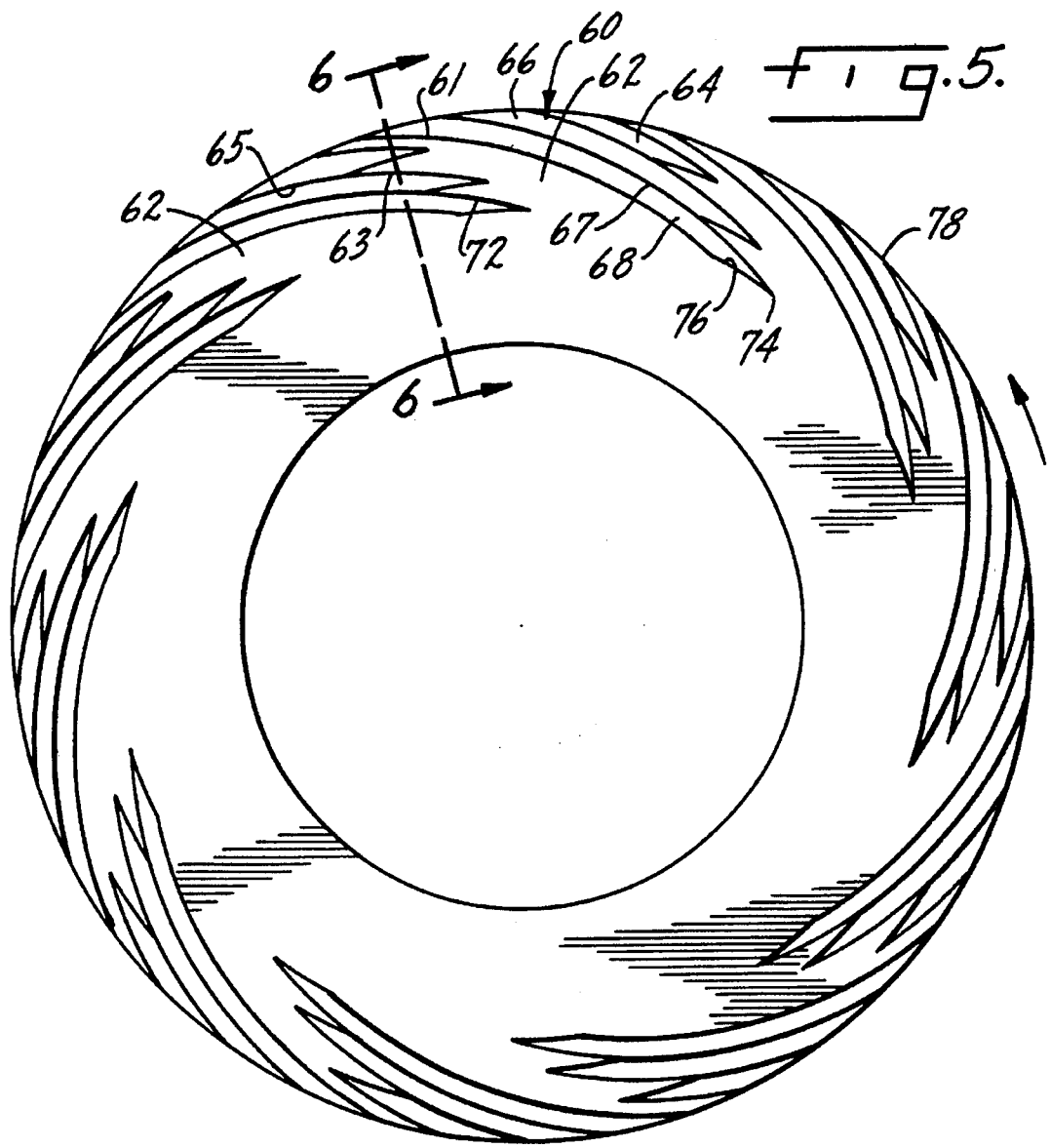
FIG. 5 shows another embodiment according to the present invention.
Figure 6:
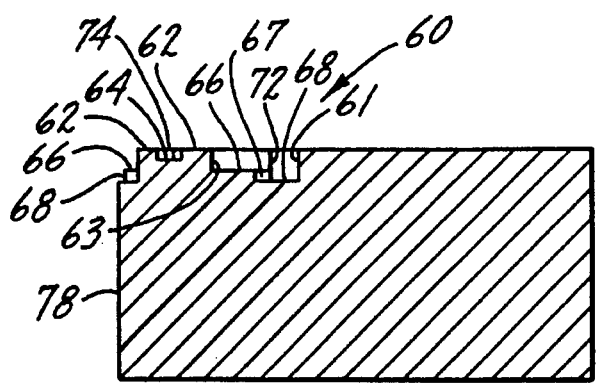
FIG. 6 shows a cross-section of a portion of the seal face of FIG. 5 taken approximately along a line 6—6.

The grooves 60 of FIGS. 5 and 6 are similar to the embodiment of FIGS. 3 and 4 in having the variation in the groove depths of surfaces of different sections of the groove 60 relative to the surface of the lands 62. However, the different groove sections having surfaces 64, 66, and 68 extend both radially and circumferentially so that the boundaries 65,67 between the section surfaces 66 and 68 may extend parallel to the leading edge boundary 61. The boundary 67 may also extend colinearly with the groove edge 72 which extends both circumferentially and radially.

In the embodiment shown in FIG. 5, and as best seen in FIG. 6, the longest extending groove section 68 extends from the outer diameter 78 to a terminal corner 74 which is closest to the inner diameter of the seal face. The surface 68 is also the deepest relative to the lands 62. The shortest groove section 64 located closest to the trailing edge 72 which intersects the circumferential edge 78 also has the shallowest surface. The intermediate groove section surface 66 is disposed between surfaces 64 and 68 and is at an intermediate depth between the surfaces of the two groove sections 64,68.

During operation of the seal having a seal ring face with grooves 60 as described above, the seal ring 10 will preferably rotate with the shaft (not shown). As has been mentioned elsewhere, it is possible that the seal ring with the grooves 60 is stationary and the opposite ring (not shown) is rotating relative to the stationary ring. The important thing is that the rings are rotating relative to each other and the relative rotation provides a pumping action of fluid from one seal face circumference at least partially across the seal face toward the other circumference.

In the preferred method of operation, the seal ring is rotating together with the shaft (not shown). As the ring rotates counterclockwise, as indicated in the FIG. 5 embodiment by the arrow, fluid is pumped inwardly by the radially extending groove adjacent the outer edge 78. As the fluid is pumped inwardly it is also being directed toward one of the plural corners 74 by the convergence of the edges 72,76 forming each of the plural corners 74. The increasing height between the section surfaces 64,66,68 further constricts the volume available for fluid in the terminal corners 74 closer to the outer circumferential edge 78 of the seal face. The converging edges and the increasing height of the surfaces together cause the pressure of the fluid being pumped inwardly to create one pressure zone immediately adjacent each of the plural corners 74. Moreover, the variance in height of each section surface 64,66,68 compensates for the decrease in length of those sections closer to the trailing boundary edge 63 of the grooves 60.

Figure 7:
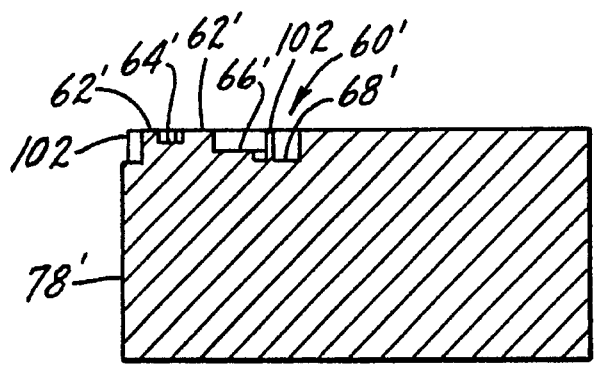
FIG. 7 shows a cross-sectional view of an alternative embodiment of the seal face illustrated in FIGS. 5 and 6.

FIG. 7 is a cross-sectional view of an alternative embodiment to that shown in FIGS. 5 and 6. The general shape of the seal face 62', including the different groove depths of each of the section surfaces 64, 66, 68, are essentially the same as in the seal face of FIG. 5, and thus these surfaces in FIG. 7 will be designated by a prime as section surfaces 64', 66' and 68'. Other elements of the embodiment of FIG. 7 which are essentially identical to the embodiment of FIGS. 5 and 6, such as circumferential edge 78', will also be indicated by a prime.

The seal ring 60' has a seal face in which lands 62' separate grooved areas which have surfaces 64', 66', 68' at different heights to each other relative to the lands 62'. In addition, the boundaries 65', 67' between the separate groove surfaces 64', 66'and 68'further comprise microdams 102, such as are disclosed in U.S. Pat. No. 5,090,712, commonly invented and assigned to a common assignee as this invention. The teachings of microdams in that patent are incorporated herein by reference, where appropriate.

Microdams 102 follow the boundaries 65', 67', which define the same general spiral shape as do boundaries 65, 67 of FIGS. 5 and 6. The microdams 102 are at the same height as the lands 62' and form a "wall" between the separate groove section surfaces 64', 66', 68'. Preferably, the microdams have a width in the range of from 0.001 to about 0.100 inches and are preferably each 0.0025 inches wide. The microdams 102, in effect, separate the section surfaces into separate grooves that are disposed adjacent each other. The function performed by these microdams 102 is thought to be an isolation of the different groove sections so that the fluid which is being pumped into the volume defined by each section surface 64', 66', 68' is effectively isolated from the fluid being pumped into the neighboring volumes. It is considered that the isolation function more evenly distributes the pumped fluid between each of the volumes of the associated section surfaces, thus better equalizing the amount of fluid mass flow being pumped into each corner 74'.

Figure 8:
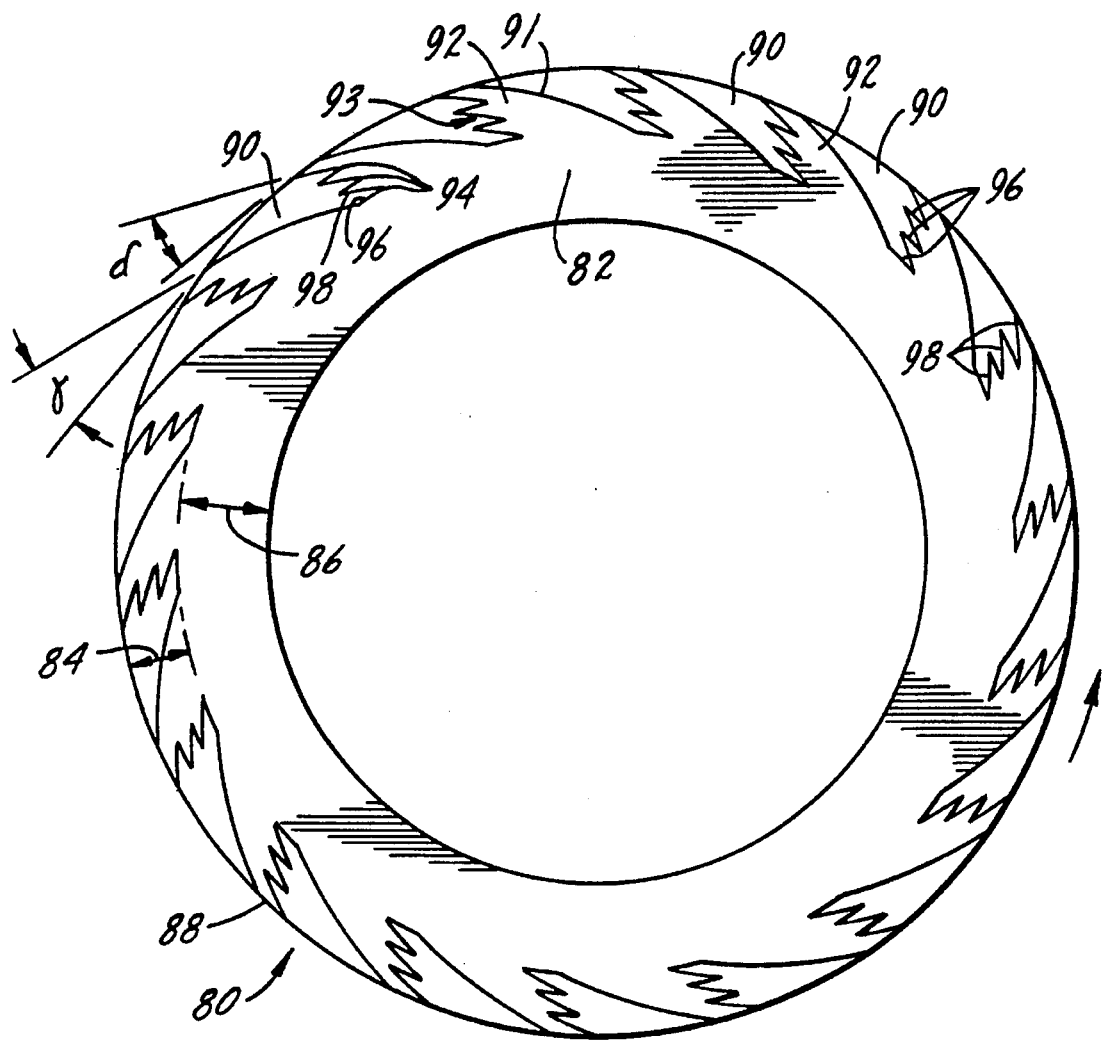
FIG. 8 shows another embodiment according to the present invention.

FIG. 8 illustrates yet another embodiment of the present invention which has a seal ring 80 with a greater number of grooves disposed on the sealing face 82 for creation of a greater number of pressure zones. The groove area 84 is annularly shaped. The annular dam 86 of seal ring 80 may be identical to the dam 16 of the embodiment of FIG. 1. The annular grooved area 84 is bounded at one annular circumference by the boundary between the dam 86 and the grooved area 84, and at the other annular circumference by grooved area 84, and at the other annular circumference by one circumferential edge 88 of the seal ring 80, whether the inner diameter edge or the outer diameter edge as shown.

The annular grooved area 84 comprises grooves 90 which are evenly disposed around one circumference of the sealing face 82. The grooves 90 are separated by lands 92 disposed between adjacent grooves 90. The circumferential edge 88 serves as one boundary of each groove 90. At least two other boundaries, a leading edge boundary 91 and a trailing edge boundary 93 also define the shape of each groove 90. Both boundaries 91 and 93 extend from the one sealing face circumferential edge 88 toward the other generally in circumferential and radial directions. As in the other embodiments, the trailing edge boundary 93 includes several edges, a pair of which define each plural terminal corner 94. These edges may be both circumferentially extending edges 96 in conjunction with circumferentially and radially extending edges 98.

The difference between the groove shape of the grooves 20 in the embodiment of FIG. 1 and the shape of groove 90 in the embodiment of FIG. 8 to some extent is found in the angle of incidence of the leading edge boundary 91 relative to the sealing face circumferential edge 88. The leading boundary 21 of the grooves 20 (FIG. 1) intersects the edge 18 at a more acute angle than does the corresponding angle of the embodiment of FIG. 8. The greater angle of incidence does not detract appreciably from the pumping capability of the grooves 90, but does provide the benefit that each groove 90 extends for a much shorter circumferential distance along circumferential edge 88. That is, the boundary of the groove 90 along the circumferential edge 88 circumscribes a significantly shorter arc than the similar boundary of the groove 20. This permits a greater number of grooves 90 to be disposed on sealing face 82, eighteen as shown in FIG. 8, compared to the ten grooves shown in the sealing face 12 of seal ring 10 (FIG. 1).

The trailing edge boundary 93 is further defined by the "lightning" pattern shown in the other embodiments. The pattern consists of edges 98 which extend radially and circumferentially and of edges 96 which extend generally circumferentially to join one end, e.g. the inner diameter end, of one edge 98 to the opposite end, e.g. the outer diameter end, of the next adjacent edge 96 of the same groove 90.

Figure 9:
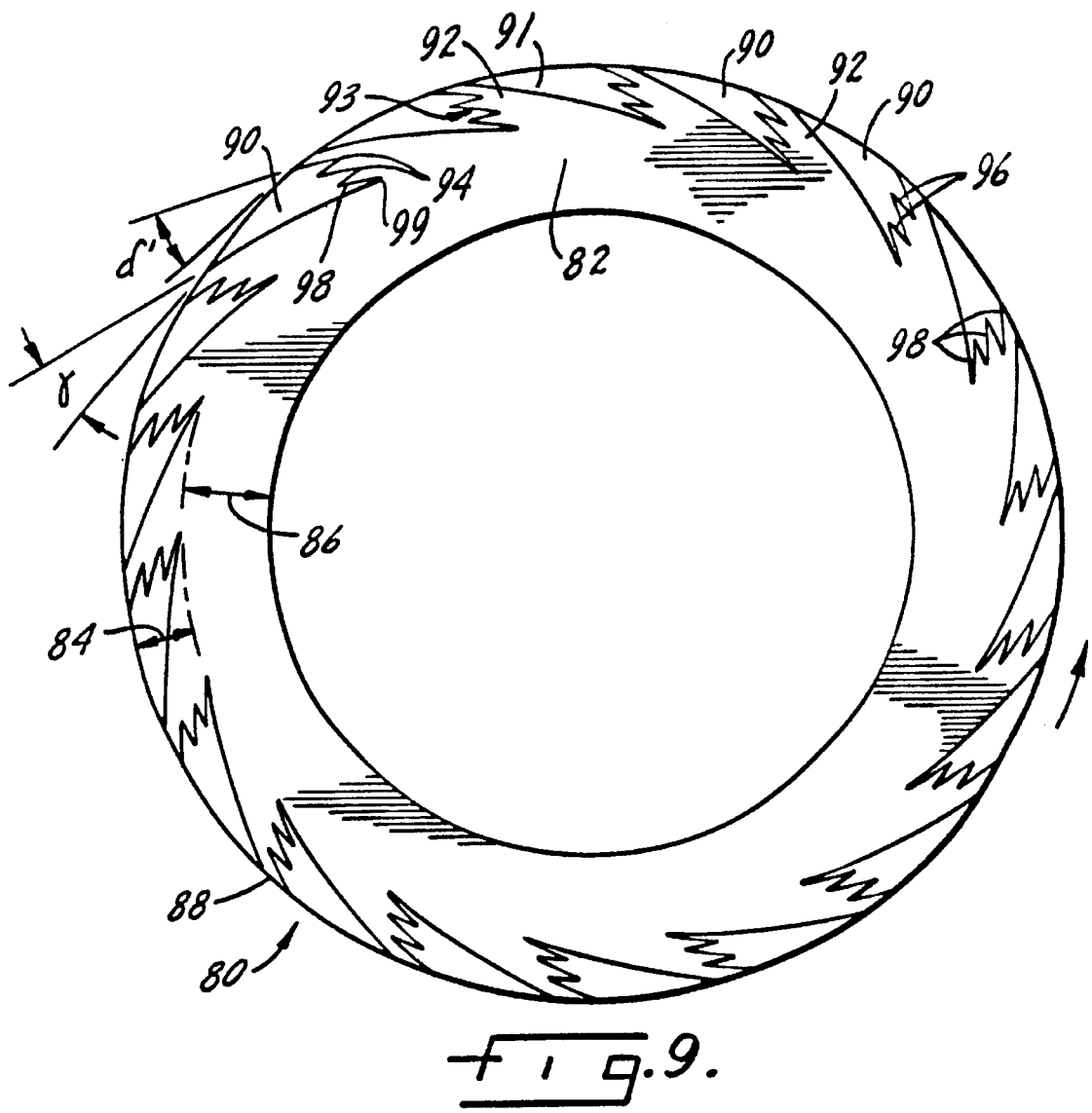
FIG. 9 illustrates still another embodiment according to the present invention.

The circumferentially and radially extending edges 98 are disposed in a general direction which is convergent with the leading edge boundary 91. Each edge 98 preferably is neither parallel nor diverent to the edge boundary 91, because divergent edges 91,98 would detract from the constricting effect of the converging edges 96,98 and these effects would undesirably tend to counteract each other. Reduction of volume available to the fluid as it is being pumped from the circumferential edge 88 inwardly along the sealing face 82 is important. The relative angle $\gamma$, defined by the leading boundary edge 91 and the circumferential edge 88, is larger as compared to the angle $\alpha$ defined by the same edges in the embodiment of FIG. 1. An angle $\delta$, formed by the trailing edges 98 and the circumferential edge 88 is approximately equal or slightly greater than the angle $\gamma$. Substantially equal angles would be convergent, due to the circumferential displacement of the points on the circumferential edge 88 about which the angles $\gamma,\delta$ are taken. Of course, an angle $\delta$ that is greater than the angle $\gamma$ would provide more convergent triangulation toward an extrapolated intersection point 99, as is shown in FIG. 9.

Other adjustments to the shape of grooves 90 may be necessary to accommodate the angle $\gamma$ having a greater value For example, for an angle $\gamma$ of approximately 30° it may be necessary to shorten or lengthen the arcs defining the generally circumferentially extending edges 96.

An important consideration in this regard is the "mass flow" or equalized fluid volume which is being pumped toward and over each of the terminal corners 94 relative to the other corners 94 of the same groove. Ideally, the mass flow which the groove 90 is directing toward each terminal corner 94 is equal to that which is directed toward the other corners 94. In this way, the amount of fluid, and the resulting pressure which is produced at each "pressure zone" is approximately equal with that produced at the other terminal corners 94. Thus, general pressure parity or equalization across a number of discrete areas of the sealing face, and distribution of those areas over a broader radial area of the sealing face, provide for approximately equal lift characteristics of each pressure zone and approximately equal heat transfers at each terminal corner 94 of each groove 90. Moreover, the capability of disposing a greater number of grooves along the grooved area 84 of the seal ring 80 distributes to a greater extent the mass flow over a greater number of terminal corners 94, thus further reducing the individual pressure generated at each corner 94.

Figure 2:
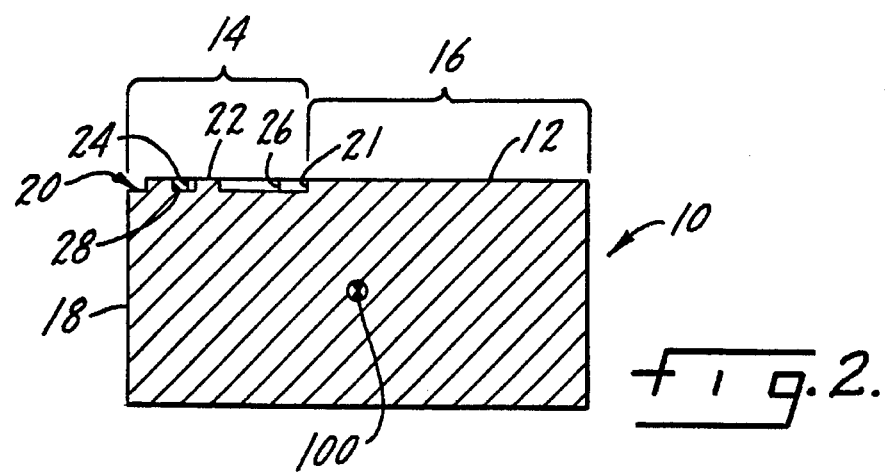
FIG. 2 is a cross-sectional view of a portion of the seal face of FIG. 1 taken approximately along the line 2—2.

Pressure distribution across a greater area provides for further stabilization of the seal gap between the sealing faces because the greater pressure zone area extends over a longer radial portion of the seal face. If viewed in cross-section, for example in FIG. 2, the pressure zone 25 which is closest to the circumferential edge 18 is located at a position much farther removed from the centroid 100 of the seal ring 10. Separation of the pressure zone from the centroid 100 provides for a larger moment arm about the centroid 100. The larger moment arm stabilizes the seal gap because it creates a more sensitive and quicker responding negative feedback loop in which a corrective force acts on a seal ring to more quickly bring the sealing faces into parallel alignment.

Other modifications are contemplated as being possible by those having ordinary skill in the art once an understanding of this invention is had. For example, differences in the surface height of the grooves may be made radially, as well as circumferentially, to provide a "stadium" pattern, the deepest groove sector being at the leading boundary of the groove closest to the circumferential edge and increasing in height as the groove depth is measured inwardly radially and also circumferentially. This would utilize the teachings of varying the groove depth as taught by both the embodiments of FIGS. 3,4 and FIGS. 5,6. Other modifications are also contemplated, such as changes in the angle made by the boundaries 21,23 and the circumferential edge 18.

Other changes, such as making the transverse portions 26 extend not only circumferentially, but also to a small extent, radially, are within the scope of the invention.

What is claimed is:

1. A mechanical face seal for providing a seal between a pair of relatively rotatable components comprising a first seal ring adapted to be mounted non-rotatably on one of said components and sealed with respect to said one component; a second seal ring adapted to be mounted non-rotatably on the other component and sealed with respect to said other component, said second seal ring being mounted in axial alignment with the first seal ring; and means being provided for resiliently urging an annular sealing face of the first seal ring axially into sealing engagement with an annular sealing face of the second seal ring; the sealing face of one of said seal rings having an annular grooved portion including a plurality of spaced apart grooved areas disposed around its circumference, with said grooved areas open to one circumferential edge of the sealing face, and a continuous annular dam provided between the grooved portion and the other circumferential edge of said sealing face, the grooved portion and the dam being defined by a circumferential border, each said grooved area having:

first and second spaced apart groove boundaries formed by groove edges, said first groove boundary defining a first point of intersection with said circumferential edge of said sealing face to which said grooved areas open and said second groove boundary defining a second point of intersection with said circumferential edge of said sealing face to which said grooved areas open, said first groove boundary and said second groove boundary having a point of intersection with said circumferential border, said groove edge of said second groove boundary including at least two spaced apart groove edge portions, each said groove edge portion extending from a point of commencement radially toward said dam and circumferentially in a direction away from said first point of intersection to a terminal point, said first groove boundary extending from said first point of intersection radially toward said dam and circumferentially in a direction toward said second point of intersection.

2. The seal according to claim 1 wherein said point of intersection of said circumferential border with said first groove boundary is spaced from said point of intersection of said circumferential border with said second groove boundary, said respective points of intersection of said first and second groove boundaries and said circumferential border are joined by a circumferentially extending groove edge which is coextensive with said circumferential border.

3. The seal according to claim 1 wherein said second point of intersection is disposed circumferentially between said first point of intersection and said point of intersection of said second boundary with said circumferential border.

4. The seal according to claim 1 wherein said terminal point of a spaced apart groove edge portion and the point of commencement of an adjacent one of said spaced apart groove edge portions are joined by a circumferentially extending edge portion.

5. The seal according to claim 4 wherein each said spaced apart groove edge portion closest to said circumferential border has a terminal point which coincides with the point of intersection of said first groove boundary with said circumferential border.

6. The seal according to claim 1 wherein said first groove boundary is a leading boundary and said second groove boundary is a trailing boundary, where leading and trailing boundaries are defined with respect to the direction of relative rotation of the seal ring including said grooves in relation to the opposing mating seal ring.

7. The seal according to claim 1 wherein said first and second spaced apart groove boundaries intersect at a common intersection point with said circumferential border.

8. A mechanical face seal for providing a seal between a pair of relatively rotatable components comprising a first seal ring adapted to be mounted non-rotatably on one of said components and sealed with respect to said one component; a second seal ring adapted to be mounted non-rotatably on the other component and sealed with respect to said other component, said second seal ring being mounted in axial alignment with the first seal ring; and means being provided for resiliently urging an annular sealing face of the first seal ring axially into sealing engagement with an annular sealing face of the second seal ring; the sealing face of one of said seal rings having an annular grooved portion including a plurality of spaced apart grooved areas disposed around its circumference, with said grooved areas open to one circumferential edge of the sealing face, and a continuous annular dam provided between the grooved portion and the other circumferential edge of said sealing face, the grooved portion and the dam being defined by a circumferential border, each said grooved area having:

first and second spaced apart groove boundaries formed by groove edges, said first groove boundary defining a first point of intersection with said circumferential edge of said sealing face to which said grooved areas open and said second groove boundary defining a second point of intersection with said circumferential edge of said sealing face to which said grooved areas open, said first groove boundary and said second groove boundary having a point of intersection with said circumferential border, said second point of intersection being disposed circumferentially between said first point of intersection and said point of intersection of said second boundary with said circumferential border, said groove edge of said second groove boundary including at least two spaced apart groove edge portions, each said groove edge portion extending from a point of commencement radially toward said dam to a terminal point, said first groove boundary extending from said first point of intersection radially toward said dam and circumferentially in a direction toward said second point of intersection said second point of intersection being disposed circumferentially between said first point of intersection and said point of intersection of said second boundary with said circumferential border.

9. The seal according to claim 8 wherein each of said at least two spaced apart groove edge portions extend from said respective point of commencement circumferentially in a direction away from said first point of intersection.

10. The seal according to claim 8 wherein said point of intersection of said circumferential border with said first groove boundary is spaced from said point of intersection of said circumferential border with said second groove boundary, said respective points of intersection of said first and second groove boundaries and said circumferential border being joined by a circumferentially extending groove edge which is coextensive with said circumferential border.

11. The seal according to claim 8 wherein said first and second spaced apart groove boundaries intersect at a common intersection point with said circumferential border.

* * * * *